(12) United States Patent
Givol et al.

(10) Patent No.: US 12,154,076 B2
(45) Date of Patent: Nov. 26, 2024

(54) PROCESSING MESSAGES FOR VALUE EXTRACTION

(71) Applicant: Capital One Services, LLC, McLean, VA (US)

(72) Inventors: Dan Givol, Arlington, VA (US); Benjamin Lindquist, Falls Church, VA (US); Victor Mayaki, Aldie, VA (US); Zviad Aznaurashvili, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/145,091

(22) Filed: Dec. 22, 2022

(65) Prior Publication Data

US 2023/0131759 A1    Apr. 27, 2023

Related U.S. Application Data

(63) Continuation of application No. 15/943,282, filed on Apr. 2, 2018, now abandoned.

(51) Int. Cl.
*G06Q 10/107* (2023.01)
*G06F 40/10* (2020.01)
(Continued)

(52) U.S. Cl.
CPC ........... *G06Q 10/107* (2013.01); *G06F 40/10* (2020.01); *G06Q 30/0222* (2013.01);
(Continued)

(58) Field of Classification Search
None
See application file for complete search history.

(56) References Cited

U.S. PATENT DOCUMENTS

| 7,734,621 B2 | 6/2010 | Weitzman et al. |
| 8,095,612 B2 * | 1/2012 | Cowan .............. G06Q 10/107 |
| | | 709/206 |

(Continued)

FOREIGN PATENT DOCUMENTS

| CA | 2736690 A1 * | 10/2011 | ....... G06K 19/06028 |

OTHER PUBLICATIONS

Author(S): Becker, J Title: TouchPoints: Journal:ERC [online]. Publication date: 2010.[retrieved on: May 28, 2023 ]. Retrieved from the Internet: < URL:https://dl.gi.de/handle/20.500.12116/19107> (Year: 2010).*

(Continued)

*Primary Examiner* — Bion A Shelden
*Assistant Examiner* — Alfred H Tsui
(74) *Attorney, Agent, or Firm* — Harrity & Harrity, LLP

(57) ABSTRACT

A device may receive access information that permits access to messages associated with an electronic messaging account. The device may process the messages associated with the electronic messaging account to identify one or more of the messages that include at least one coupon after receiving the access information. The one or more of the messages may be identified using at least two of an image processing technique, a text processing technique, or a code processing technique. The device may store information identifying the one or more of the messages that include the at least one coupon after processing the messages. The device may perform one or more actions to facilitate use of the at least one coupon in association with completing a transaction.

20 Claims, 7 Drawing Sheets

(51) Int. Cl.
| | |
|---|---|
| *G06Q 30/0207* | (2023.01) |
| *G06Q 30/0272* | (2023.01) |
| *G06V 30/40* | (2022.01) |
| *G06V 30/412* | (2022.01) |
| *G06V 30/416* | (2022.01) |
| *H04L 9/40* | (2022.01) |

(52) U.S. Cl.
CPC ..... *G06Q 30/0224* (2013.01); *G06Q 30/0272* (2013.01); *G06V 30/40* (2022.01); *H04L 63/102* (2013.01); *G06V 30/412* (2022.01); *G06V 30/416* (2022.01)

(56) References Cited

U.S. PATENT DOCUMENTS

| | | | |
|---|---|---|---|
| 8,949,283 | B1 | 2/2015 | Cornwell et al. |
| 9,384,502 | B2* | 7/2016 | Guo ................. G06F 16/951 |
| 2007/0174116 | A1 | 7/2007 | Keith et al. |
| 2007/0174259 | A1 | 7/2007 | Amjadi et al. |
| 2008/0167991 | A1 | 7/2008 | Carlson et al. |
| 2009/0234745 | A1 | 9/2009 | Ramer et al. |
| 2010/0088166 | A1 | 4/2010 | Tollinger |
| 2011/0231238 | A1* | 9/2011 | Khan ................ G06Q 30/0207 705/14.1 |
| 2012/0067944 | A1* | 3/2012 | Ross ................. G06Q 30/0201 235/494 |
| 2012/0215611 | A1 | 8/2012 | Korson et al. |
| 2013/0204697 | A1* | 8/2013 | Boal .................... G06Q 10/00 705/14.51 |
| 2014/0067677 | A1* | 3/2014 | Ali ....................... G06Q 20/40 705/44 |
| 2015/0100416 | A1 | 4/2015 | Blackhurst et al. |
| 2015/0170175 | A1 | 6/2015 | Zhang et al. |
| 2016/0063528 | A1* | 3/2016 | Zhang .............. G06Q 30/0207 705/14.1 |
| 2018/0181951 | A1 | 6/2018 | Goldfinger et al. |
| 2019/0205939 | A1* | 7/2019 | Lal ........................ G06N 3/045 |
| 2019/0303963 | A1 | 10/2019 | Givol et al. |

OTHER PUBLICATIONS

Author(s): Ribiero, Dan Title: Techniques for place aware advertising Journal:Academia [online]. Publication date: 2013.[retrieved on: Sep. 27, 2023 ]. Retrieved from the Internet: < URL:https://www.academia.edu/download/97101861/eeum_di_dissertacao_pg17617.pdf> (Year: 2013).*

Author(s): Wray Title: Mobile advertising engine Journal:PSU [online]. Publication date: 2009.[retrieved on: Dec. 9, 2023 ]. Retrieved from the Internet: < URL:https://citeseerx.ist.psu.edu/document?repid=rep1&type=pdf&doi=0292bd96e8f7b13e55ebba5375b538bfafbe7d75> (Year: 2009).*

Author(s):Alsmadi Title: Clustering and classification of email contents Journal: PSU [online]. Publication date: 2015[retrieved on: Mar. 22, 2024 ]. Retrieved from the Internet: < URL:https://www.sciencedirect.com/science/article/pii/S1319157814000573> (Year: 2015).*

Author(s): Wray Title: Mobile advertising engine for centralized mobile coupon delivery Journal: SSRN [online]. Publication date: 2011.[retrieved on: Jul. 12, 2024]. Retrieved from the Internet: < URL: https://papers.ssrn.com/sol3/papers.cfm?abstract_id=1881025 > (Year: 2011).*

Crowe M., et al., "Mobile Phone Technology: "Smarter" Than We Thought," Federal Reserve Bank of Boston, Nov. 16, 2012, [Retrieved on Nov. 10, 2021], Retrieved from the Internet: URL: https://www.bostonfed.org/-/media/Documents/PaymentStrategies/mobile-phone-technology.pdf, 30 pages.

Danaher et al., "Where, When, and How Long: Factors That Influence the Redemption of Mobile Phone Coupons," Journal of Marketing Research, Oct. 2015, pp. 1-29, Retrieved from the Internet: [URL: https://search.ebscohost.com/login.aspx?direct=true&db=bth&AN=109545970&site=ehost-live&scop] [retrieved on Feb. 24, 2021].

Wikipedia, "Paribus," https://en.wikipedia.org/wiki/Paribus, Mar. 22, 2018, 3 pages.

Hui S., Mobile promotions: A frame work and research priorities Journal: Interactive marketing [online]. Publication date 2016 [retrieved on Sep. 6, 2022]. Retrieved from the Internet: URL:http://www.sciencedirect.com/science/article/pii/S1094996816300044 (Year: 2016).

* cited by examiner

PROCESSING MESSAGES FOR VALUE EXTRACTION

RELATED APPLICATION

This application is a continuation of U.S. patent application Ser. No. 15/943,282, filed Apr. 2, 2018, which is incorporated herein by reference in its entirety.

BACKGROUND

Discounts or rebates may be provided to an individual in the form of a digital coupon that can be redeemed when purchasing a product. Digital coupons may be distributed through an electronic messaging account, the Internet, an application installed on a user device, and/or the like. An individual wanting to use a digital coupon may print the digital coupon (e.g., for use with a reader device, such as a barcode reader, a Quick Response (QR) code reader, and/or the like), may access the digital coupon via an application, and/or the like.

SUMMARY

According to some possible implementations, a device may include one or more memories; and one or more processors, communicatively coupled to the one or more memories, configured to receive access information that permits access to messages associated with an electronic messaging account. The one or more processors may process the messages associated with the electronic messaging account to identify one or more of the messages that include at least one coupon after receiving the access information. The one or more of the messages may be identified using at least two of an image processing technique, a text processing technique, or a code processing technique. The one or more processors may store information identifying the one or more of the messages that include the at least one coupon after processing the messages. The one or more processors may perform one or more actions to facilitate use of the at least one coupon in association with completing a transaction.

According to some possible implementations, a non-transitory computer-readable medium may store one or more instructions that, when executed by one or more processors, cause the one or more processors to access an electronic messaging account using access information associated with the electronic messaging account. The electronic messaging account may be associated with messages from one or more third parties. The one or more instructions, when executed by the one or more processors, may cause the one or more processors to process the messages associated with the electronic messaging account to identify one or more of the messages that include at least one respective coupon after accessing the electronic messaging account. The one or more of the messages may be identified using at least two of an image processing technique, a text processing technique, or a code processing technique. A coupon, of the at least one respective coupon, may be associated with a third party of the one or more third parties. The one or more instructions, when executed by the one or more processors, may cause the one or more processors to store information identifying the one or more of the messages that include the at least one respective coupon after processing the messages. The one or more instructions, when executed by the one or more processors, may cause the one or more processors to perform one or more actions to facilitate use of the at least one respective coupon in association with completing a transaction.

According to some possible implementations, a method may include receiving, by a device, access information that permits access to messages associated with multiple electronic messaging accounts. The method may include processing, by the device, the messages associated with the multiple electronic messaging accounts to identify one or more of the messages that include a respective coupon after receiving the access information. The one or more of the messages may be identified based on at least two of an image included in the one or more of the messages, text included in the one or more of the messages, or code associated with the one or more of the messages. The method may include storing, by the device, information identifying the one or more of the messages that include the respective coupon after processing the messages. The method may include performing, by the device, one or more actions to facilitate use of a coupon, of the respective coupon, in association with completing a transaction. The method may include recording, by the device, information indicating that the coupon has been used in association with completing the transaction after performing the one or more actions.

DETAILED DESCRIPTION

The following detailed description of example implementations refers to the accompanying drawings. The same reference numbers in different drawings may identify the same or similar elements.

Digital coupons may be distributed to an individual via an electronic messaging account (e.g., an email account, an instant messaging account, a text messaging account, etc.). In some cases, an electronic messaging account may receive hundreds, thousands, or more digital coupons. In addition, each of the digital coupons may be associated with different amounts of discounts or rebates, different expiration dates, different third parties, different terms and/or conditions, and/or the like. The volume and/or complexity of having different digital coupons in an electronic messaging account may result in unused digital coupons (e.g., where an individual loses the digital coupons in the electronic messaging account), may cause processing resources and/or computing resources related to facilitating navigation through electronic messages in the electronic messaging account to be consumed as a result of the individual searching inefficiently through the electronic messaging account to find the digital coupons, and/or the like.

Some implementations described herein provide a message configuration platform that is capable of identifying digital coupons in an electronic messaging account and extracting information related to the digital coupons. In this way, the message configuration platform can aggregate information related to hundreds, thousands, or more digital coupons in a centralized, organized, and easily accessible manner. In addition, the message configuration platform can dynamically prompt a user of a user device to use a digital coupon without the user needing to access an electronic messaging account and/or to search through the electronic messaging account to locate the digital coupon. This conserves processing resources and/or computing resources that would otherwise be consumed when an individual inefficiently searches through an electronic messaging account to identify a digital coupon. In addition, this increases a use of digital coupons by an individual, thereby increasing an amount of discounts or rebates received by the individual for various transactions. Further, this reduces an amount of time needed to locate and/or use a digital coupon, thereby increasing an efficiency of locating the digital coupon in the electronic messaging account and/or using the digital coupon.

Figure 1A:
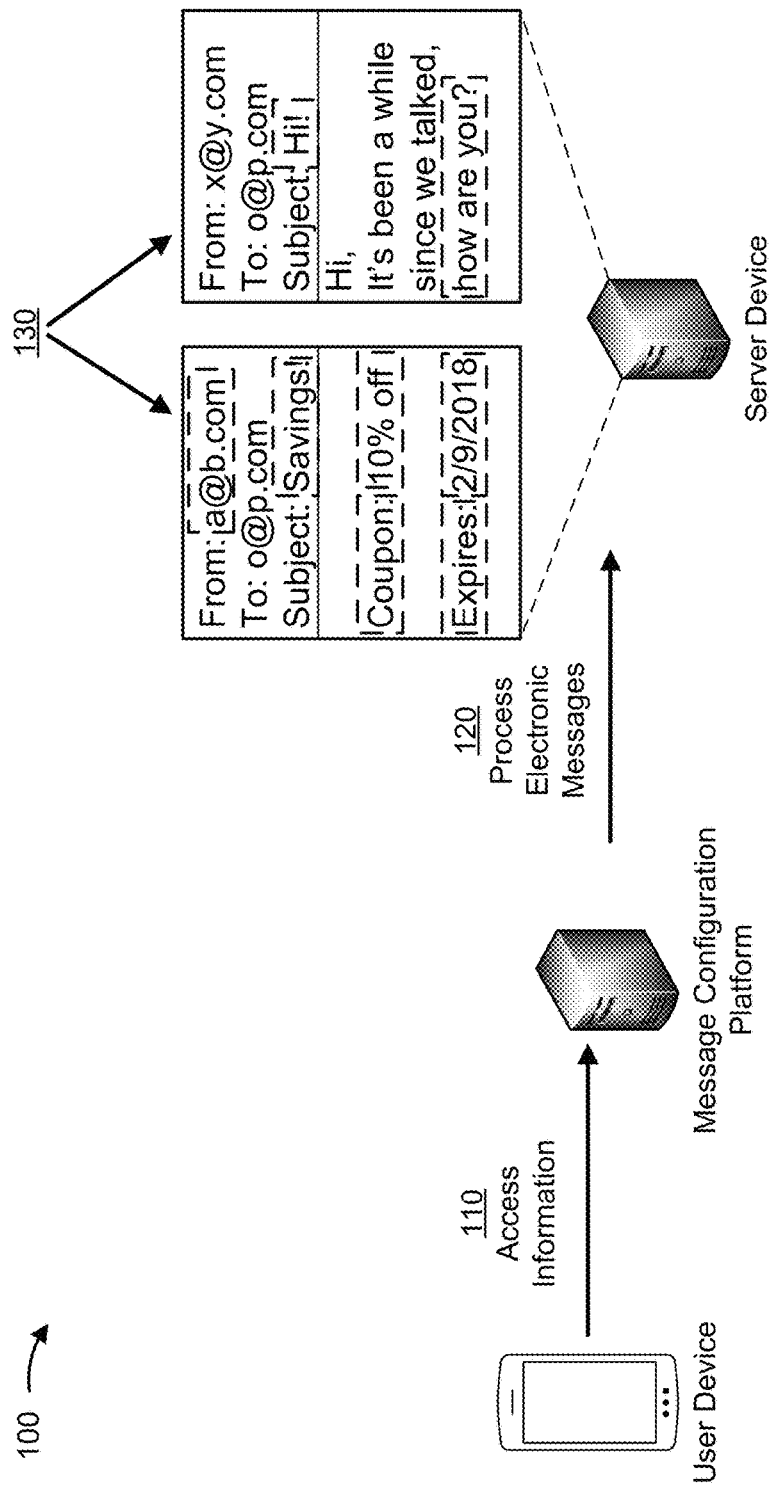
FIGS. 1A and 1B are diagrams of an overview of an example implementation described herein.
Figure 1B:
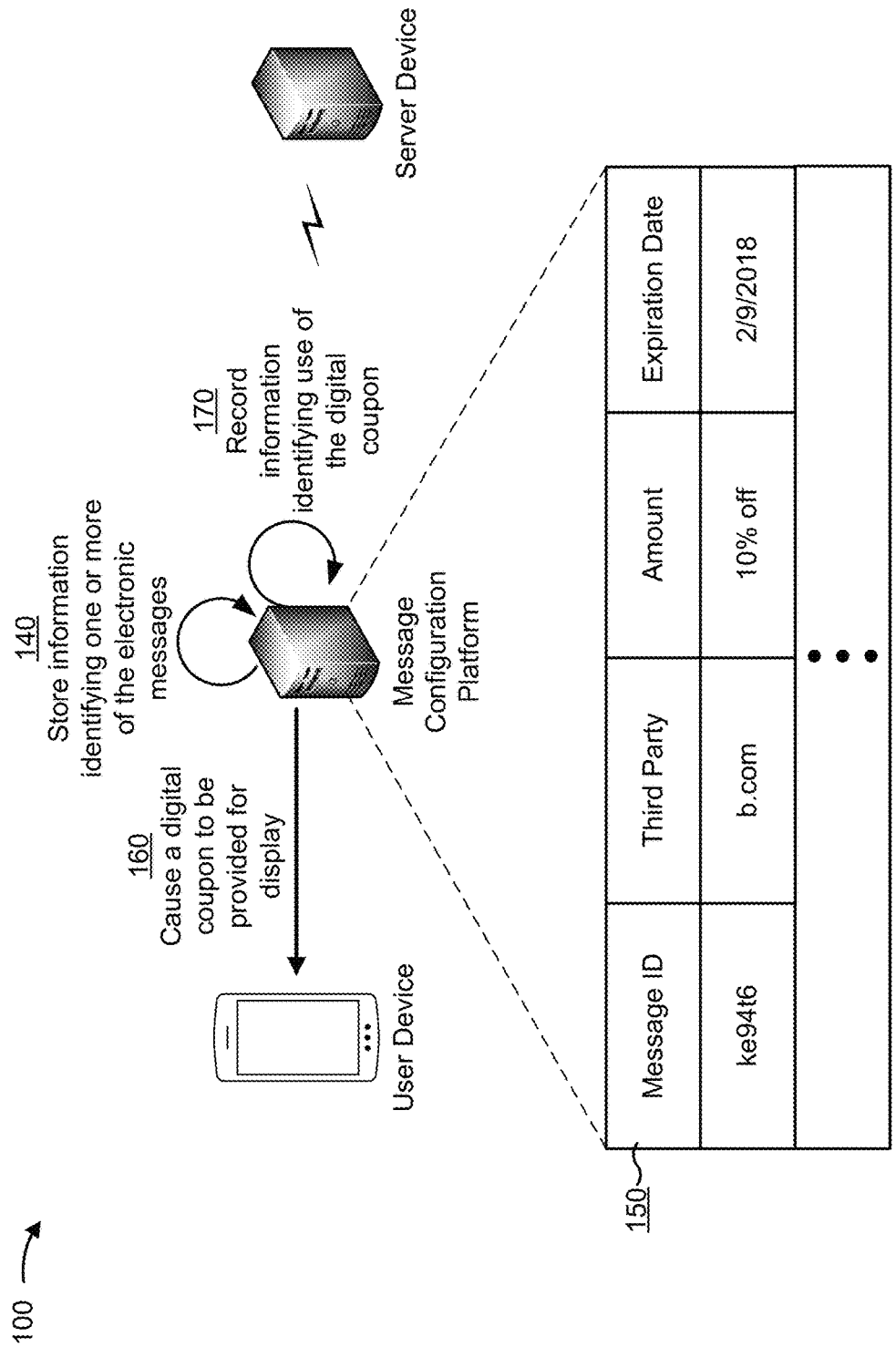

FIGS. 1A and 1B are diagrams of an overview of an example implementation 100 described herein. As shown, implementation 100 includes a user device, a message configuration platform, and a server device.

As shown by reference number 110, the message configuration platform may receive, from the user device, access information (e.g., that permits the message configuration platform to access an electronic messaging account). For example, the access information may include a set of credentials associated with an electronic messaging account, a username/password combination, a security token (e.g., that provides limited access to an electronic messaging account), and/or the like. In some implementations, an electronic messaging account may include an email account, a text messaging account, an instant messaging account, and/or the like. In some implementations, an electronic messaging account may be associated with electronic messages (e.g., stored on the server device), such as email messages, text messages, instant messages, and/or the like. In some implementations, an electronic messaging account may store hundreds, thousands, or more electronic messages from hundreds, thousands, or more third parties, that include different types of content (e.g., personal content, a digital coupon, an advertisement, etc.), and/or the like. In some implementations, a digital coupon may include information that identifies a third party with which the digital coupon is associated, an amount of a discount, a rebate, a reward, and/or the like associated with the digital coupon, an expiration date of the digital coupon, terms and/or conditions associated with the digital coupon, and/or the like.

In some implementations, the message configuration platform may receive the access information based on requesting the access information from the user device (e.g., by providing a prompt for display via a display associated with the user device, by causing a user interface to be provided for display via the display, etc.), based on a user of the user device inputting the access information (e.g., via a user interface, via an application installed on the user device, etc.), and/or the like. In some implementations, the access information may permit the message configuration platform to access electronic messages associated with an electronic messaging account for a particular amount of time, stored in a particular folder associated with the electronic messaging account (e.g., in an inbox folder, in a spam folder, etc.), and/or the like. In some implementations, the server device may prompt a user of the user device to permit the message configuration platform to access the electronic messaging account (e.g., in a manner similar to a two-factor authentication). This increases a security of providing the message configuration platform with access to an electronic messaging account by providing the message configuration platform with limited access to the electronic messaging account, by providing the user of the user device with control over whether the message configuration platform can access the electronic messaging account, and/or the like.

In some implementations, after receiving the access information, the message configuration platform may access an electronic messaging account using the access information. For example, the message configuration platform may access the electronic messaging account by logging into the electronic messaging account (e.g., after navigating a web browser to a login page associated with the electronic messaging account and inputting the access information to the login page), by providing the access information to the server device, and/or the like. Continuing with the previous example, the message configuration platform may communicate with the server device via internet message access protocol (IMAP), post office protocol (POP), a proxy authentication system, such as Open Authorization (OAuth), and/or the like.

As shown by reference number 120, the message configuration platform may process electronic messages in the electronic messaging account by accessing electronic messages associated with an electronic messaging account (e.g., an electronic messaging account that is hosted on the server device, electronic messages that are stored on the server device, etc.). For example, the message configuration platform may process the electronic messages to identify digital coupons included in the electronic messages. In some implementations, the message configuration platform may process hundreds, thousands, or more electronic messages in hundreds, thousands, or more electronic messaging accounts. In this way, the electronic messaging account may process a set of electronic messages that cannot be processed manually or objectively (e.g., in a consistent manner) by a human actor.

In some implementations, the message configuration platform may pre-process the electronic messages to reduce the quantity of electronic messages that are further processed to identify digital coupons. For example, the message configuration platform may filter the electronic messages by a source of the electronic messages (e.g., domain name of a source of the electronic messages, whether the source is included on a list of sources provided by an individual associated with the electronic messaging account, etc.), a folder into which the electronic messages have been filtered by the server device hosting the electronic messaging account (e.g., an inbox, a promotions folder, a spam folder, etc.), a date on which the electronic messages were received (e.g., electronic messages older than a particular date may not be processed), and/or the like.

Additionally, or alternatively, the message configuration platform may discard or ignore electronic messages (e.g., from third parties that are not likely to be associated with digital coupons, such as personal messages, newsletters, etc.). For example, the message configuration platform may identify electronic messages associated with a third party that may be likely to be associated with a digital coupon by performing a lookup of a domain name associated with an electronic message, by analyzing a repository of hundreds, thousands, or more electronic messages to determine if the same electronic message was sent to other electronic messaging accounts (e.g., indicating that the electronic message may be from a business), by performing a lookup of a portion of a source identifier (e.g., a user identifier before the "@" symbol in an email address), and/or the like. Additionally, or alternatively, and as another example, the message configuration platform may analyze historical electronic messages associated with a folder and determine a theme for the folder (e.g., a personal theme, a promotional theme, etc.) and may discard or ignore electronic messages in the folder based on the theme.

Additionally, or alternatively, the message configuration platform may identify terms and/or phrases included in a subject line and/or in a body of the electronic messages and may discard electronic messages that include particular combinations of terms and/or phases. Additionally, or alternatively, and as another example, the message configuration platform may discard duplicate electronic messages (e.g., electronic messages that have the same header, the same body, the same unique identifier, etc.). This conserves processing resources of the message configuration platform by reducing a quantity of electronic messages that the message configuration platform may have to process, by filtering electronic messages that are unlikely to include a digital coupon, and/or the like.

In some implementations, the message configuration platform may process the electronic messages using a combination of processing techniques (e.g., after pre-processing the electronic messages) to identify digital coupons included in, or associated with, the electronic messages. For example, the message configuration platform may process the electronic messages using an image processing technique (e.g., a computer vision technique, an optical character recognition (OCR) technique, etc.), a text processing technique (e.g., a natural language processing technique, a text analysis technique, etc.), a code processing technique, and/or the like.

In some implementations, when processing the electronic messages using the image processing technique, the message configuration platform may process images associated with the electronic messages. In some implementations, the message configuration platform may identify that an electronic message includes an image by detecting that the electronic message includes an image as an attachment (e.g., based on a file type of the attachment), by detecting an image in a body of the electronic message (e.g., as compared to detecting text in the body of the electronic message), by processing code associated with the electronic message to detect an image (e.g., by detecting an image tag in code of an email or by detecting a unique resource identifier for an image included in the code), and/or the like. In some implementations, the message configuration platform may process the image to identify a term, a phrase, a logo, a symbol, and/or the like included in the image. For example, the message configuration platform may process the image using OCR to identify a digital coupon included in the image, a third party with which the digital coupon is associated, an amount of a discount or a rebate included in the digital coupon, an expiration date of the digital coupon, and/or the like.

Additionally, or alternatively, the message configuration platform may capture an image of the body of an electronic message (e.g., text and images included in the body of the electronic message), such as by saving a copy of the electronic message as a portable data format (PDF) document or by capturing a screen shot of the electronic message, and may process the image in a similar manner (e.g., to identify terms, phrases, logos, etc. included in the image of the body of the electronic message). For example, the message configuration platform may capture an image of text of the electronic message, images included in the electronic message, and/or the like and may process the image to identify a digital coupon included in the electronic message, to extract information related to the digital coupon from the electronic message, and/or the like.

In some implementations, an image associated with the electronic message may include one or more digital coupons, a single digital coupon may be comprised of multiple images, and/or the like. In some implementations, the electronic messaging platform may identify multiple coupons in a single image. For example, when processing the image, the electronic messaging platform may identify characteristics of the image that indicate that multiple digital coupons are included in the image. Continuing with the previous example, the message configuration platform may identify each of the multiple digital coupons in the image by identifying lines or boxes in the image that surround or separate the multiple digital coupons in the image from each other, by identifying multiple unique identifiers in the image (e.g., serial numbers, bar code numbers, etc. of different digital coupons), by identifying multiple different bar codes, QR codes, and/or the like in the image (e.g., corresponding to multiple different digital coupons), by identifying repeating terms and/or phrases in the image (e.g., multiple expiration dates associated with corresponding digital coupons), and/or the like.

In some implementations, when processing the electronic messages using the text processing technique, the message configuration platform may process text of the electronic message to identify terms, phrases, and/or the like included in the text (e.g., to identify digital coupons included in the text, to extract information related to the digital coupons, etc.). For example, the message configuration platform may process the text of the electronic messages to identify terms and/or phrases that may be likely related to a digital coupon, that identify a third party with which a digital coupon is likely to be associated (e.g., a retailer, a service provider, etc.), and/or the like.

In some implementations, when processing the electronic messages using the code processing technique, the message configuration platform may process code associated with an electronic message to identify a digital coupon included in the electronic messages, to identify information related to the digital coupon, and/or the like. For example, the message configuration platform may analyze code (e.g., hypertext markup language (HTML) code, cascading style sheet (CSS) code, etc.) associated with electronic messages, tags within the code (e.g., a div tag, an image tag, text-related tags, etc.), and/or the like associated with the electronic messages.

In some implementations, by processing the code, tags within the code, and/or the like, the message configuration platform may be capable of identifying text within the message, images within the message, a likelihood that an image includes a digital coupon, and/or the like. For example, the message configuration platform may be configured with information that identifies a hierarchy of the code associated with the electronic message (e.g., the code may be structured in a hierarchical manner that impacts execution of the code, tags associated with the code may have a hierarchical structure to organize information in the code and/or to impact a manner in which the information is provided for display, etc.).

In some implementations, the message configuration platform may span the hierarchical structure of the code associated with an electronic message to identify a digital coupon included in the electronic message, to identify information related to the electronic message, and/or the like. For example, the message configuration platform may span the hierarchical structure of the code to identify text and/or images included in the code. Continuing with the previous example, if the message configuration platform identifies an image in the code of the electronic message, then the message configuration platform may span the hierarchical structure (e.g., tags that are at a higher or lower level in the hierarchical structure) to identify information (e.g., text, metadata, etc.) that may be associated with the image. Continuing still with the previous example, the message configuration platform may then process the information associated with the image to determine whether the image includes a digital coupon (e.g., using a text processing technique to identify terms, phrases, and/or the like included in the information that indicates that the image includes a digital coupon).

In some implementations, the message configuration platform may determine a score that indicates a likelihood that an electronic message includes a digital coupon based on a result of processing the electronic message. For example, the message configuration platform may use a machine learning model that has been trained on a training set of data that identifies results of processing electronic messages and corresponding scores indicating a likelihood that the electronic messages include a digital coupon. In some implementations, the message configuration platform may use the score to identify electronic messages from which to extract digital coupons, electronic messages to store, electronic messages to tag, and/or the like, as described elsewhere herein. This conserves processing resources by providing the message configuration platform with a quick and easy way to identify electronic messages that are likely to include a digital coupon, thereby reducing a quantity of electronic messages that the message configuration platform processes that do not include a digital coupon.

Reference number 130 shows an example of the message configuration platform identifying electronic messages that are likely to include a digital coupon. For example, and as further shown, the message configuration platform may identify a source of the electronic messages (e.g., shown as "a@b.com" for the left electronic message and "x@y.com" for the right electronic message), terms and/or phrases included in the electronic messages (e.g., shown as "Savings!," "Coupon," "10% off," "Expires," and "Feb. 9, 2018" for the left electronic message and "Hi!," and "how are you?" for the right electronic message). In some implementations, the terms and/or phrases identified for the left message may indicate that the electronic message includes a digital coupon, and the terms and/or phrases identified for the right electronic message may indicate that the electronic message does not include a digital coupon, that the right electronic message is personal in nature, and/or the like. In some implementations, the message configuration platform may determine a score for the electronic messages based on this information identified in the electronic messages, as described elsewhere herein.

In some implementations, the message configuration platform may determine whether a score for an electronic message satisfies a threshold. For example, and with regard to the two messages associated with reference number 130, the message configuration platform may determine that a score for the left electronic message satisfies a threshold and that the score for the right electronic message does not satisfy a threshold. In some implementations, the message configuration platform may extract information from an electronic message when the score associated with the electronic message satisfies a threshold. For example, and referencing the electronic messages associated with reference number 130, the message configuration platform may extract information related to a digital coupon included in the left electronic message.

Additionally, or alternatively, the message configuration platform may not extract any information from the right electronic message, may tag the right electronic message with information identifying that the right electronic message is not to be processed in the future, and/or the like. This conserves processing resources of the message configuration platform by reducing or eliminating future processing of particular electronic messages. In addition, the information used to tag the electronic messages as personal in nature may be recognized by other platforms, thereby increasing a privacy of the electronic messages by causing the other platforms to not process electronic messages tagged in that manner and/or conserving processing resources of the other platforms by reducing a quantity of electronic messages that the other platforms have to process.

Turning to FIG. 1B, and as shown by reference number 140, the message configuration platform may store information identifying one or more of the messages. For example, and as shown by reference number 150, the message configuration platform may store, in a data structure, coupon information, such as an identifier for an electronic message (e.g., shown as "Message ID"), information identifying a third party with which the electronic message is associated (e.g., shown as "b.com"), information identifying an amount of a discount or a rebate associated with a digital coupon (e.g., shown as "10% off"), information identifying an expiration date for the digital coupon (e.g., shown as "Feb. 9, 2018"), and/or the like.

Additionally, or alternatively, the message configuration platform may store a copy of the electronic message and/or a digital coupon included in the electronic message (e.g., in memory resources associated with the message configuration platform). Additionally, or alternatively, the message configuration platform may tag an electronic message in the electronic messaging account. For example, the message configuration platform may tag an electronic message with a label that identifies the electronic message as including a digital coupon. Additionally, or alternatively, the message configuration platform may store information that identifies an electronic message in a data structure (e.g., information that the message configuration platform can use to identify the electronic message in the electronic messaging account) and corresponding information related to a digital coupon included in the electronic message. For example, the corresponding information may include coupon information, such as information that identifies an expiration date for the digital coupon an amount of a rebate or discount for the coupon, a serial number for the coupon, and/or a third party with which the coupon is associated, an image of a bar code, a QR code, a logo, etc. related to the digital coupon, and/or the like.

In some implementations, the message configuration platform may determine a score for a digital coupon (e.g., a weighted score, an average score, etc.). For example, the score may indicate a value of the digital coupon. In some implementations, the score may be based on a rebate or discount associated with the digital coupon, an amount of time remaining prior to an expiration date of the digital coupon, and/or the like. In some implementations, the message configuration platform may determine the score using a machine learning model (e.g., that has been trained on information related to digital coupons and corresponding scores) where an output of the machine learning model is a score based on information associated with a digital coupon.

In some implementations, the message configuration platform may determine a rank of various digital coupons for the same third party, the same type of transaction (e.g., a retail transaction, a bill pay transaction, etc.), and/or the like relative to each other based on corresponding scores. In some implementations, the message configuration platform may prioritize notifying a user of the user device to use the multiple digital coupons based on corresponding scores for the digital coupons (e.g., where a digital coupon with a higher relative score or a lower relative score is prioritized higher than another digital coupon).

In some implementations, the message configuration platform may monitor a location of a user device associated with an individual associated with an electronic messaging account relative to a location of a third party (e.g., a third party for which a digital coupon was identified in the electronic messaging account). For example, the message configuration platform may monitor the location of the user device based on information, from a geographic positioning system (GPS) component of the user device, that identifies a location of the user device, based on information, from the user device or a transaction terminal, that identifies a location or a third party of the transaction terminal with which the user device is communicating to complete a transaction, and/or the like.

In some implementations, the message configuration platform may perform one or more actions to facilitate use of a digital coupon. For example, and as shown by reference number 160, the message configuration platform may cause a digital coupon to be provided for display via a display associated with the user device. In some implementations, when a location of the user device and a location of the third party satisfies a threshold, the message configuration platform may cause a notification to be provided for display via a display associated with the user device (e.g., a notification that identifies that a digital coupon, associated with the third party, is available for use). Additionally, or alternatively, the message configuration platform may cause an application to open on the user device so that a user of the user device can select a digital coupon. Additionally, or alternatively, the message configuration platform may automatically apply a digital coupon to a transaction by causing the user device to provide information related to a digital coupon to a transaction terminal in association with other information used to complete a transaction.

In some implementations, the message configuration platform may monitor use of the digital coupon. For example, the message configuration platform may monitor information from the user device that indicates whether the user device provided information related to a digital coupon to a transaction terminal (e.g., thereby indicating that the digital coupon was used). Additionally, or alternatively, and as another example, the user device may monitor, using an accelerometer component of the user device, a movement of the user device while a bar code, a QR code, and/or the like is provided for display, to determine whether the movement of the user device matches movement related to scanning the bar code, the QR code, and/or the like (e.g., indicating that the digital coupon was used). In this case, the user device may provide, to the message configuration platform, information indicating whether the coupon was used based on information from the accelerometer to notify the message configuration platform that the digital coupon was used.

Additionally, or alternatively, and as another example, the message configuration platform may receive, from a transaction terminal and/or a transaction backend device, transaction information that indicates whether a digital coupon was applied to a transaction, information that identifies the digital coupon applied to the transaction, and/or the like. Additionally, or alternatively, when the user device provides a digital coupon for display, the user device may initiate a timer. In this case, when the timer expires, or records that a threshold amount of time has elapsed, the user device may determine that the digital coupon has been applied to a transaction and may notify the message configuration platform that the digital coupon was used. Additionally, or alternatively, the user of the user device may interact with a user interface to modify a status of the coupon from being unused to having been used and the user device may notify the message configuration platform of the change in status.

As shown by reference number 170, the message configuration platform may record information identifying use of the digital coupon. For example, the message configuration platform may store, in a data structure, information indicating that the digital coupon has been used. Additionally, or alternatively, and as another example the message configuration platform may remove information related to a digital coupon from a data structure. Additionally, or alternatively, the message configuration platform may provide a notification for display via the user device that indicates that the digital coupon was used.

In some implementations, the message configuration platform may perform one or more other actions related to use of a digital coupon. For example, the message configuration platform may perform analytics on a use of a digital coupon for an individual and/or across hundreds, thousands, or more individuals. Additionally, or alternatively, and as another example, the message configuration platform may update an account to reflect use of the digital coupon (e.g., to reflect a rebate received for using the digital coupon, to reflect points received for using the digital coupon, etc.).

In this way, the message configuration platform may process electronic messages associated with an electronic messaging account to identify digital coupons included in the electronic messages. In addition, the message configuration platform may perform one or more actions related to facilitating use for the digital coupons. This increases an amount of a discount or a rebate received by an individual for a transaction by increasing a use of digital coupons. In addition, this enhances organization and/or use of digital coupons, thereby conserving processing resources that would otherwise be consumed by inefficient manual access to digital coupons.

As indicated above, FIGS. 1A and 1B are provided merely as an example. Other examples are possible and may differ from what was described with regard to FIGS. 1A and 1B. For example, rather than processing electronic messages, the message configuration platform may monitor online shopping activity of a user of the user device (e.g., by receiving information from the user device that identifies the online shopping activity of the user, such as when the user device detects that the user has navigated a web browser to a particular web page of a retailer). In this case, the message configuration platform may identify digital coupons from a repository of digital coupons related to third party web pages the user has visited or is visiting, goods and/or services associated with the web pages that the user has visited or is visiting, and/or the like.

Figure 2:
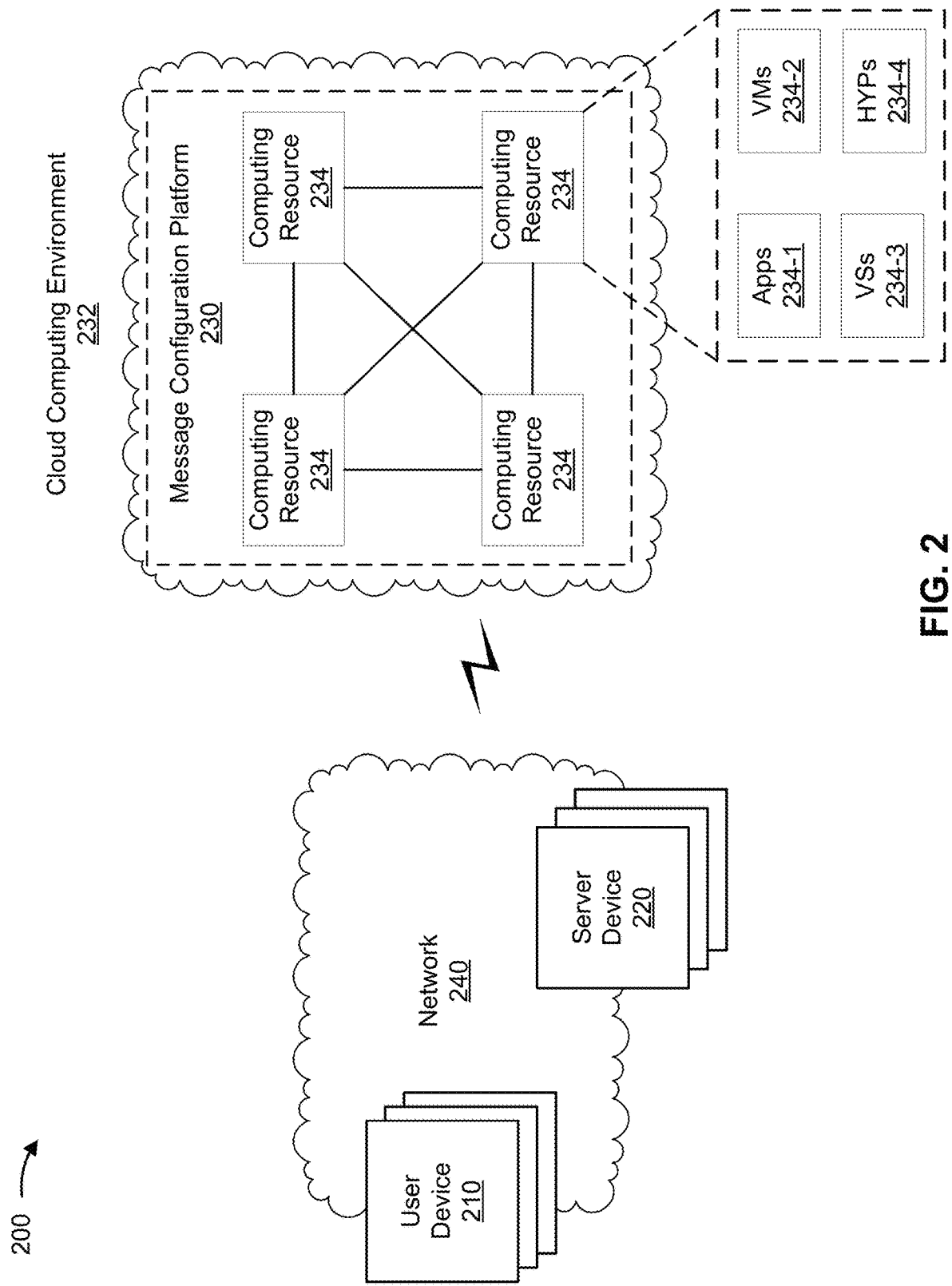
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of user devices 210 (e.g., referred to collectively as "user devices 210" and individually as "user device 210"), a set of server devices 220 (e.g., referred to collectively as "server devices 220" and individually as "server device 220"), message configuration platform 230 in cloud computing environment 232 that includes a set of computing resources 234, and network 240. Devices of environment 200 may interconnect via wired connections, wireless connections, or a combination of wired and wireless connections.

User device 210 includes one or more devices capable of receiving, generating, storing, processing, and/or providing information related to identifying a digital coupon included in an electronic message. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, a set-top box, or a similar type of device. In some implementations, user device 210 may provide, to message configuration platform 230, access information related to an electronic messaging account associated with a user of user device 210, as described elsewhere herein. Additionally, or alternatively, user device 210 may receive, from message configuration platform 230, a result of processing electronic messages to identify digital coupons included in the electronic messages, as described elsewhere herein.

Server device 220 includes one or more devices capable of receiving, generating, storing, processing, and/or providing information related to identifying a digital coupon included in an electronic message. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may be a physical device implemented within a housing, such as a chassis. In some implementations, server device 220 may be a virtual device implemented by one or more computer devices of a cloud computing environment or a data center. In some implementations, server device 220 may host an electronic messaging account, as described elsewhere herein. Additionally, or alternatively, server device 220 may permit message configuration platform 230 to process messages stored by server device 220 (e.g., based on message configuration platform 230 providing access information related to the electronic messaging account), as described elsewhere herein.

Message configuration platform 230 includes one or more devices capable of receiving, generating, storing, processing, and/or providing information related to identifying a digital coupon in an electronic messaging account. For example, message configuration platform 230 may include a cloud server or a group of cloud servers. In some implementations, message configuration platform 230 may be designed to be modular such that certain software components can be swapped in or out depending on a particular need. As such, message configuration platform 230 may be easily and/or quickly reconfigured for different uses.

In some implementations, as shown, message configuration platform 230 may be hosted in cloud computing environment 232. Notably, while implementations described herein describe message configuration platform 230 as being hosted in cloud computing environment 232, in some implementations, message configuration platform 230 may not be cloud-based (i.e., may be implemented outside of a cloud computing environment) or may be partially cloud-based.

Cloud computing environment 232 includes an environment that hosts message configuration platform 230. Cloud computing environment 232 may provide computation, software, data access, storage, and/or other services that do not require end-user knowledge of a physical location and configuration of a system and/or a device that hosts message configuration platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host message configuration platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with message configuration platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
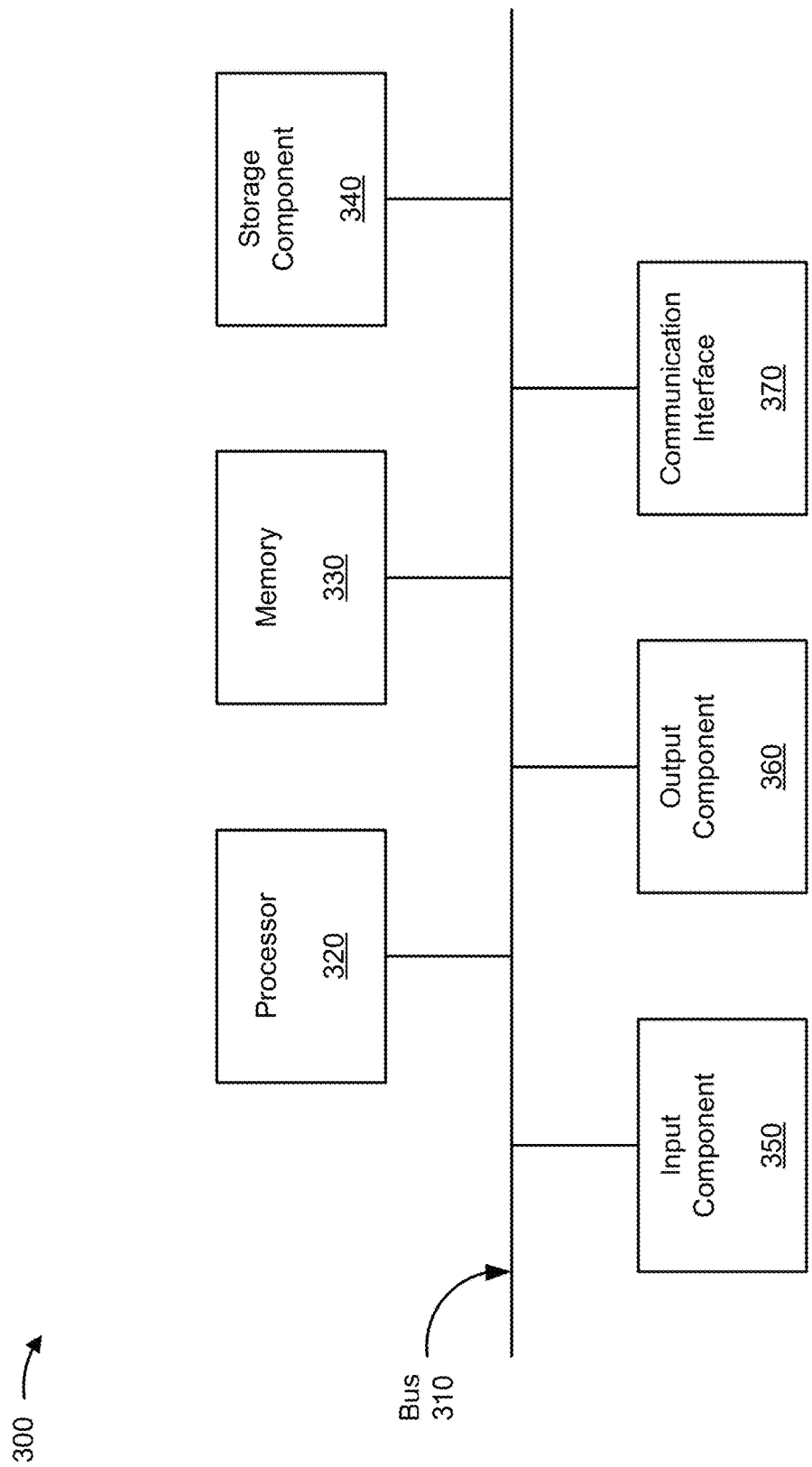
FIG. 3 is a diagram of example components of one or more devices of FIG. 2.

FIG. 3 is a diagram of example components of a device 300. Device 300 may correspond to user device 210, server device 220, message configuration platform 230, and/or computing resource 234. In some implementations, user device 210, server device 220, message configuration platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
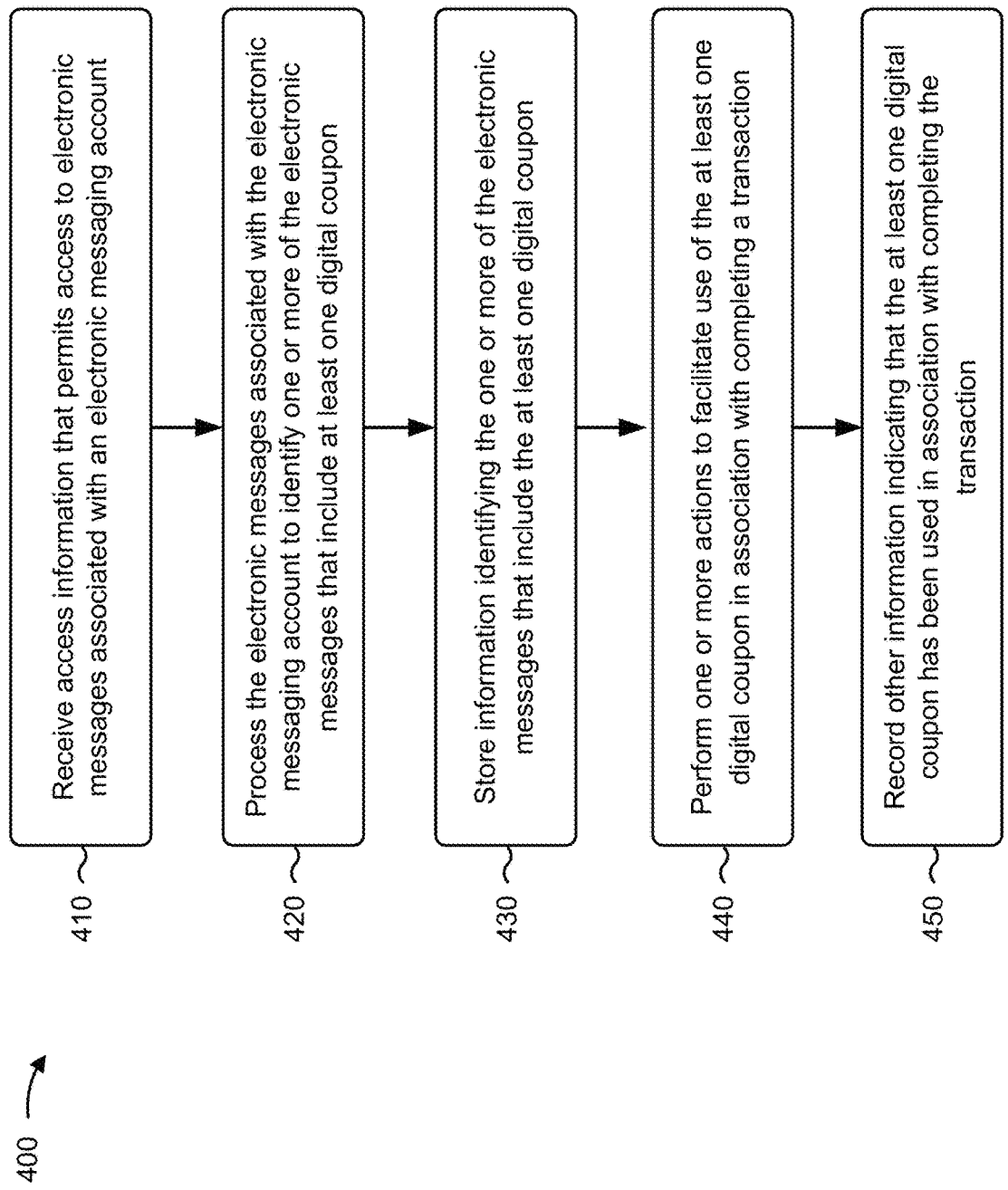
FIG. 4 is a flow chart of an example process for processing messages for value extraction.

FIG. 4 is a flow chart of an example process 400 for processing messages for value extraction. In some implementations, one or more process blocks of FIG. 4 may be performed by message configuration platform 230. In some implementations, one or more process blocks of FIG. 4 may be performed by another device or a group of devices separate from or including message configuration platform 230, such as user device 210, server device 220, or computing resource 234.

As shown in FIG. 4, process 400 may include receiving access information that permits access to electronic messages associated with an electronic messaging account (block 410). For example, message configuration platform 230 may receive (e.g., using computing resource 234, processor 320, communication interface 370, and/or the like) access information that permits access to electronic messages associated with an electronic messaging account, as described above in connection with FIGS. 1A-1B and 2.

As further shown in FIG. 4, process 400 may include processing the electronic messages associated with the electronic messaging account to identify one or more of the electronic messages that include at least one digital coupon (block 420). For example, message configuration platform 230 may process (e.g., using computing resource 234, processor 320, and/or the like) the electronic messages associated with the electronic messaging account to identify one or more of the electronic messages that include at least one digital coupon (e.g., a respective coupon), as described above in connection with FIGS. 1A-1B and 2.

As further shown in FIG. 4, process 400 may include storing information identifying the one or more of the electronic messages that include the at least one digital coupon (block 430). For example, message configuration platform 230 may store (e.g., using computing resource 234, processor 320, memory 330, storage component 340, and/or the like) information identifying the one or more of the electronic messages that include the at least one digital coupon, as described above in connection with FIGS. 1A-1B and 2.

As further shown in FIG. 4, process 400 may include performing one or more actions to facilitate use of the at least one digital coupon in association with completing a transaction (block 440). For example, message configuration platform 230 may perform (e.g., using computing resource 234, processor 320, and/or the like) one or more actions to facilitate use of the at least one digital coupon in association with completing a transaction, as described above in connection with FIGS. 1A-1B and 2.

As show in FIG. 4, process 400 may include recording other information indicating that the at least one digital coupon has been used in association with completing the transaction (block 450). For example, message configuration platform 230 may record (e.g., using computing resource 234, processor 320, memory 330, storage component 340, and/or the like) other information indicating that the at least one digital coupon has been used in association with completing the transaction, as described above in connection with FIGS. 1A-1B and 2.

Process 400 may include additional aspects, such as any single aspect or any combination of aspects described below.

In some implementations, message configuration platform 230 may access the electronic messaging account by providing the access information to server device 220 that hosts the electronic messaging account using one or more protocols. In some implementations, message configuration platform 230 may extract metadata associated with the one or more of the electronic messages after identifying the one or more of the electronic messages, and may store the information and the metadata after extracting the metadata. In some implementations, message configuration platform 230 may identify multiple digital coupons in an electronic message of the one or more of the electronic messages after processing the electronic messages, and may store the information for the multiple digital coupons after identifying the multiple digital coupons. In some implementations, message configuration platform 230 may identify one or more images included in one or more of the electronic messages, and may process the one or more images using an image processing technique after identifying the one or more images.

In some implementations, message configuration platform 230 may process code associated with the electronic messages using a code processing technique, may identify a portion of the one or more of the electronic messages that includes the at least one digital coupon after processing the code, and may extract other information related to the at least one digital coupon from the one or more of the messages after identifying the portion of the one or more of the electronic messages by processing the code associated with the one or more of the electronic messages. In some implementations, message configuration platform 230 may process a hierarchical structure of code associated with the electronic messages using the code processing technique, and may identify the one or more of the electronic messages that include the at least one digital coupon after processing the hierarchical structure of the code.

In some implementations, message configuration platform 230 may process the electronic messages to identify a set of terms or phrases included in the electronic messages, and may process the set of terms or phrases using a rules module to determine whether the electronic messages include the at least one digital coupon after processing the electronic messages. In some implementations, message configuration platform 230 may tag, in the electronic messaging account, the one or more of the electronic messages with an indicator that indicates that the one or more of the electronic messages include the at least one digital coupon, and may store the information identifying the one or more of the electronic messages after tagging the one or more of the electronic messages with the indicator. In some implementations, message configuration platform 230 may store an identifier for each of the one or more of the electronic messages after identifying the one or more of the electronic messages (e.g., where the identifier identifies the each of the one or more of the electronic messages as including the at least one digital coupon).

In some implementations, message configuration platform 230 may determine that the at least one digital coupon was used in association with completing the transaction after performing the one or more actions, and may tag the at least one digital coupon as having been used after determining that the at least one digital coupon was used. In some implementations, message configuration platform 230 may provide the at least one digital coupon for display after receiving an indication of a selection to provide the at least one digital coupon for display (e.g., where the indication of the selection is received via a user interface provided for display), and may record the other information, for the at least one digital coupon, after providing the at least one coupon for display. In some implementations, message configuration platform 230 may initiate a timer after providing the at least one coupon for display (e.g., where the timer indicates an amount of time the at least one coupon has been provided for display), may determine that the amount of time indicated by the timer satisfies a threshold after initiating the timer, and may record the other information after determining that the amount of time satisfies the threshold.

In some implementations, message configuration platform 230 may determine that coupon information related to the digital coupon was provided to a transaction terminal, may determine that the digital coupon was used after determining that the coupon information was provided to the transaction terminal, and may record the information after determining that the digital coupon was used. In some implementations, message configuration platform 230 may process transaction information to determine that the digital coupon was used after performing the one or more actions (e.g., where the transaction information is related to the transaction), and may record the information after processing the transaction information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
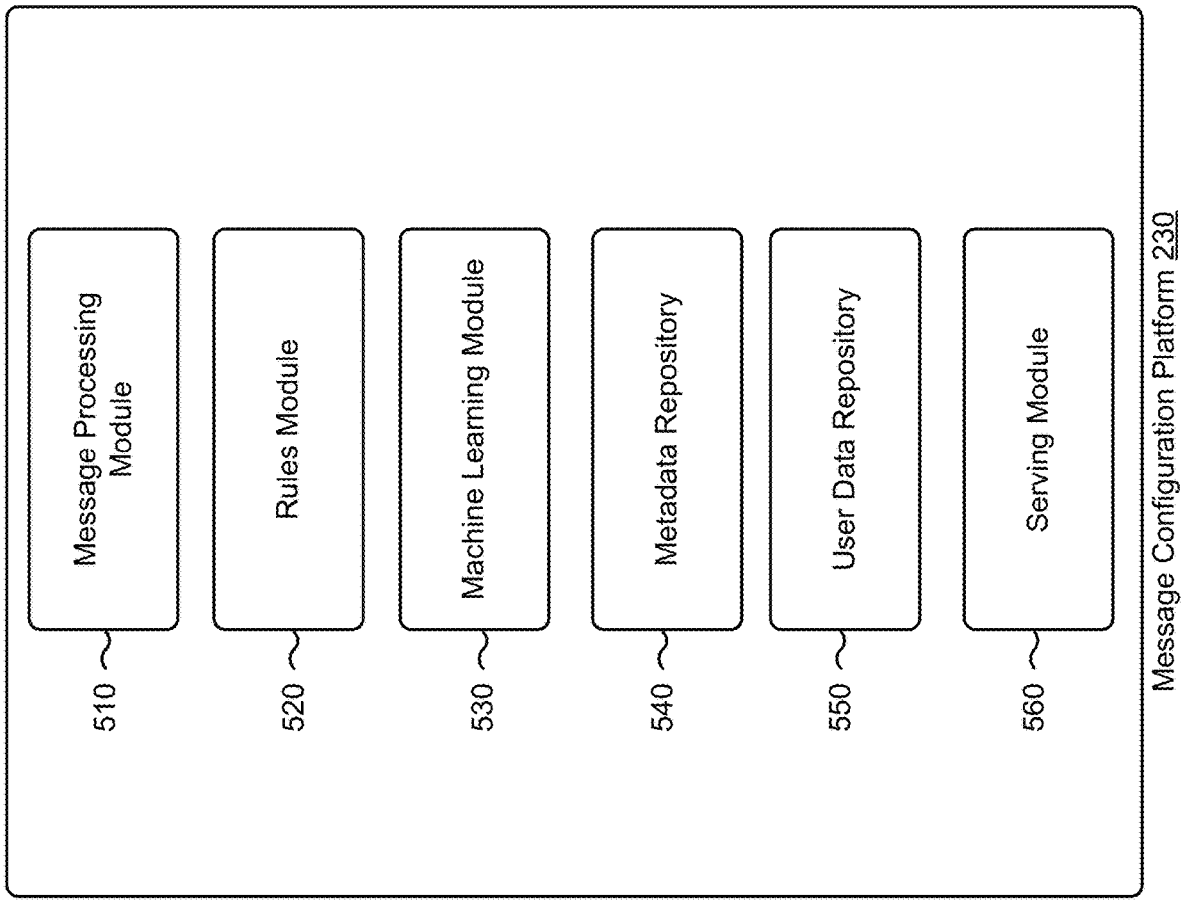
FIG. 5 is a diagram of an example implementation relating to the example process shown in FIG. 4.

FIG. 5 is a diagram of an example implementation 500 related to the example process shown in FIG. 4. FIG. 5 shows example modules and/or repositories that may be associated with message configuration platform 230.

As shown in FIG. 5, and by reference number 510, message configuration platform 230 may include a message processing module. In some implementations, the message processing module may connect message configuration platform 230 to server device 220 (e.g., so that message configuration platform 230 can access an electronic messaging account). For example, the message processing module may securely negotiate the connection with server device 220 and may ensure that message configuration platform 230 adheres to any access or processing limitations associated with the electronic messaging account (e.g., limits on the amount of time that message configuration platform 230 can process electronic messages, a point in time past which message configuration platform 230 cannot process messages, such as an opt-in time by a user of the electronic messaging account, folders which message configuration platform 230 is permitted to scan or prohibited from scanning, etc.). Additionally, or alternatively, the message processing module may process electronic messages included in the electronic messaging account. Additionally, or alternatively, the message processing module may retrieve electronic messages (e.g., that include digital coupons) from the electronic messaging account.

As shown by reference number 520, message configuration platform 230 may include a rules module. In some implementations, the rules module may process characteristics of an electronic message and/or an image in an electronic message to determine whether the characteristics indicate that the message and/or the image includes a digital coupon (e.g., characteristics identified by a machine learning module). For example, the rules module may determine whether the electronic message and/or the image includes a particular combination of terms and/or phrases associated with digital coupons. In some implementations, the rules module may include hardware and/or software that execute instructions to perform the functions described herein. For example, the rules module may include one or more processors that execute particular instructions related to processing characteristics of a coupon.

As shown by reference number 530, message configuration platform 230 may include a machine learning module. In some implementations, the machine learning module may have been trained on a training set of data that includes terms, phrases, symbols, images, and/or the like and information that indicates a likelihood that different combinations of the terms, phrases, symbols, images, and/or the like are associated with a digital coupon. In some implementations, the machine learning module may process electronic messages, one or more images associated with an electronic message, and/or the like to determine whether the electronic message, the image, and/or the like includes a digital coupon (e.g., using a machine learning or artificial intelligence technique). In some implementations, the machine learning module and the rules module may function in combination. For example, the machine learning module may extract characteristics of an electronic message and/or an image using a machine learning model and the rules module may determine a likelihood of the electronic message and/or the image including a digital coupon based on the characteristics.

As shown by reference number 540, message configuration platform 230 may include a metadata repository. In some implementations, the metadata repository may include a data structure, a database, and/or the like that stores metadata associated with an electronic message that includes a digital coupon, associated with the digital coupon, and/or the like. For example, the metadata may include information that identifies a source of the electronic message and/or the digital coupon, a subject of an electronic message in which a digital coupon is included, a date of an electronic message, and/or the like.

As shown by reference number 550, message configuration platform 230 may include a user data repository. In some implementations, the user data repository may include a data structure, a database, and/or the like that stores access information associated with an electronic messaging account (e.g., which the message processing module may use to access the electronic messaging account).

As shown by reference number 560, message configuration platform 230 may include a serving module. In some implementations, the serving module may communicate with an application (e.g., installed on user device 210) to serve information related to an electronic message and/or a digital coupon to user device 210. For example, the serving module may use representational state transfer (RESTful) services to serve the information to user device 210.

As indicated above, FIG. 5 is provided merely as an example. Other examples are possible and may differ from what was described with regard to FIG. 5.

Figure 6:
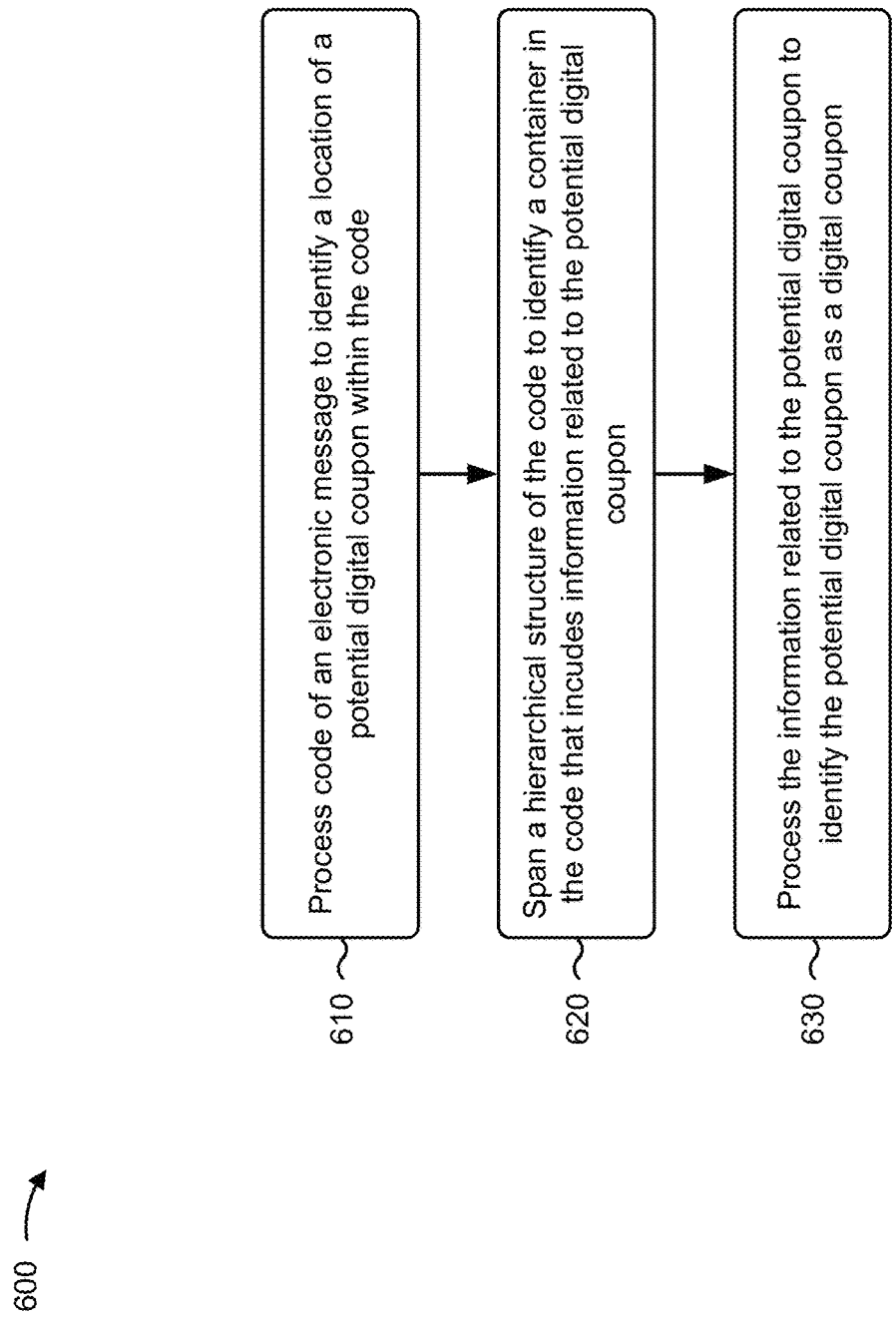
FIG. 6 is another flow chart for another example process related to the example process shown in FIG. 4.

FIG. 6 is a flow chart of an example process 600 for processing messages for value extraction. In some implementations, one or more process blocks of FIG. 6 may be performed by message configuration platform 230. In some implementations, one or more process blocks of FIG. 6 may be performed by another device or a group of devices separate from or including message configuration platform 230, such as user device 210, server device 220, or computing resource 234.

As shown in FIG. 6, process 600 may include processing code of an electronic message to identify a location of a potential digital coupon within the code (block 610). For example, message configuration platform 230 may process (e.g., using computing resource 234, processor 320, and/or the like) code of an electronic message to identify a location of a potential digital coupon within the code. In some implementations, code may include hypertext markup language (HTML), extensible markup language (XML), cascading style sheets (CSS), and/or the like and may be used to display text, images, and/or the like associated with an electronic message. In some implementations, the code may include a hierarchical structure of tags and/or other portions of code that influence the manner in which the code is executed, that influence output from execution of the code, and/or the like.

In some implementations, when processing the code, message configuration platform 230 may generate a mapping of the code. For example, message configuration platform 230 may generate a mapping of tags, containers, portions, and/or the like of the code. As a specific example, related to HTML, message configuration platform 230 may generate a mapping of body tags, div tags, image tags, and/or the like in the code based on processing the code.

In some implementations, message configuration platform 230 may identify a location of a potential digital coupon in the code. For example, and related to HTML, message configuration platform 230 may identify an image embedded in the code (e.g., based on identifying an image-type file embedded in the code, an image tag in the code, etc.). Additionally, or alternatively, and as another example related to HTML, message configuration platform 230 may process text (e.g., associated with a body tag) to identify particular terms and/or phrases indicative of a digital coupon.

In this way, message configuration platform 230 may process code prior to spanning a hierarchical structure of the code.

As further shown in FIG. 6, process 600 may include spanning a hierarchical structure of the code to identify a container in the code that includes information related to the potential digital coupon (block 620). For example, message configuration platform 230 may span (e.g., using computing resource 234, processor 320, and/or the like) a hierarchical structure of the code to identify a container in the code that includes information related to the potential digital coupon. In some implementations, a container may include a parent node (e.g., a parent tag in HTML) in the hierarchical structure that includes the potential digital coupon and information related to the potential digital coupon. For example, a div tag in HTML may be a container that includes an image tag with an image of a digital coupon and a text-related tag for text related to the image.

In some implementations, when spanning the hierarchical structure, message configuration platform 230 may ascend the parent-child node relationship to identify a container for the potential digital coupon. For example, in HTML, message configuration platform 230 may ascend the hierarchical structure of tags in HTML code from an image tag, which may include the potential digital coupon, to the nearest div tag. Continuing with the previous example, after identifying the nearest div tag, message configuration platform 230 may descend the hierarchical structure within the div tag to identify other information that is potentially related to the potential digital coupon, such as text or text-related tags within the div tag. In this way, message configuration platform 230 can identify potentially relevant information in code that can be used to determine whether a potential digital coupon is a digital coupon.

In this way, message configuration platform 230 may span a hierarchical structure of the code prior to processing information related to the potential digital coupon.

As further shown in FIG. 6, process 600 may include processing the information related to the potential digital coupon to identify the potential digital coupon as a digital coupon (block 630). For example, message configuration platform 230 may process the information related to the potential digital coupon to identify the potential digital coupon as a digital coupon.

In some implementations, message configuration platform 230 may process the information using a text processing technique and/or an image processing technique, similar to that described elsewhere herein. For example, message configuration platform 230 process text in the same div tag as the potential digital coupon to identify terms and/or phrases that may indicate whether the potential digital coupon is a digital coupon. Continuing with the previous example, the text may include a description of the potential digital coupon and/or may describe a context of the electronic message. Additionally, or alternatively, and as another example, message configuration platform 230 may process one or more other images in the same div tag as the potential digital coupon to determine whether the potential digital coupon is a digital coupon. Continuing with the previous example, the one or more other images may include a description of the potential digital coupon and/or may include other information that describes a context of the electronic message. In this way, message configuration platform 230 may process information related to a potential digital coupon to contextually determine whether a potential digital coupon is a digital coupon.

In this way, message configuration platform 230 may process the information related to the potential digital coupon to identify the potential digital coupon as a digital coupon.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, message configuration platform 230 may dynamically process electronic messages to extract digital coupons from the electronic messages. This reduces or eliminates a need for a user of an electronic messaging account to search through an inbox for digital coupons, thereby reducing an amount of time needed to locate and use the digital coupons. In addition, this facilitates seamless and/or centralized access to the digital coupons by a user of a user device, thereby increasing an efficiency of accessing digital coupons for use. Further, by extracting digital coupons from corresponding electronic messages, memory resources related to storing digital coupons are conserved (e.g., relative to storing an entire message for a digital coupon).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a first device, access information permitting access to an electronic messaging account hosted on a server device,
        wherein the access information permits access to the electronic messaging account by the first device for a particular amount of time;
    communicating, by the first device and based on the access information, with the server device to access the electronic messaging account hosted on the server device,
        wherein the communication is limited to the particular amount of time;
    analyzing, by the first device, historical messages associated with a folder related to the electronic messaging account;
    determining, by the first device and based on analyzing the historical messages, a theme associated with the folder;
    processing, by the first device, messages associated with the electronic messaging account to identify one or more messages, of the messages, that include at least one coupon,
        wherein one or more other messages associated with the folder are discarded from processing based on the theme, and
        wherein the processing comprises:
            capturing one or more first images of at least one of text in the messages or one or more second images included in the messages, and
            processing the one or more first images to determine the one or more messages that include that at least one coupon;
    storing, by the first device and at a repository, information associated with the one or more messages and the at least one coupon;
    receiving, by the first device, information associated with online activity related to a second device;
    monitoring, by the first device and based on the information associated with the online activity, the online activity related to the second device,
        wherein the monitoring includes processing information associated with detection of navigation to a first web page of a retailer;
    identifying, by the first device and from the repository, one or more coupons from the at least one coupon,
        wherein the repository stores information associated with the one or more coupons, and
        wherein the information associated with the one or more coupons is related to one or more web pages, including the first web page, that were visited by a user of the second device;
    causing, by the first device, information associated with the one or more coupons to be provided to a third device to complete a transaction; and
    storing, by the first device and based on sensor information from an accelerometer component that is used to monitor movement while second information associated with the one or more coupons is provided for display, first information indicating whether the one or more coupons were used.

2. The method of claim 1, further comprising:
    monitoring data from the second device to determine whether the second device provided the information associated with the one or more coupons to the third device; and
    recording, based on determining that the second device provided the information associated with the one or more coupons to the third device, information identifying that the one or more coupons have been used.

3. The method of claim 1, wherein the information associated with the one or more coupons comprises:
    identification information of an electronic message associated with the one or more coupons,
    third party information associated with the one or more coupons,
    information associated with an amount related to the one or more coupons, and
    an expiration date associated with the one or more coupons.

4. The method of claim 1, further comprising:
    capturing, an image of an electronic message associated with the user;
    identifying, based on processing the image, the one or more coupons; and
    storing the information associated with the one or more coupons in the repository.

5. The method of claim 1, further comprising:
    determining, based on accessing the electronic messaging account, a score associated with the one or more coupons,
        wherein the one or more coupons are further associated with an email related to the electronic messaging account; and
    notifying, based on a priority, the user to use a particular coupon of the one or more coupons,
        wherein the priority is determined based on the score associated with the particular coupon.

6. A first device, comprising:
    one or more memories; and
    one or more processors, coupled to the one or more memories, configured to:
        receive access information permitting access to an electronic messaging account hosted on a server device,
            wherein the access information permits access to the electronic messaging account by the first device for a particular amount of time;
        communicate, based on the access information, with the server device to access the electronic messaging account hosted on the server device, wherein the communication is limited to the particular amount of time;
analyze historical messages associated with a folder related to the electronic messaging account;
determine, based on analyzing the historical messages, a theme associated with the folder;
process messages associated with the electronic messaging account to identify one or more messages, of the messages, that include at least one coupon,
   wherein one or more other messages associated with the folder are discarded from processing based on the theme, and
   wherein the processing comprises:
      capturing one or more first images of at least one of text in the messages or one or more second images included in the messages, and
      processing the one or more first images to determine the one or more messages that include that at least one coupon;
store, at a repository, information associated with the one or more messages and the at least one coupon;
receive information associated with online activity related to a second device;
monitor, based on the information associated with the online activity, the online activity related to the second device,
   wherein the monitoring includes processing information associated with detection of navigation to a first web page of a retailer;
identify, from the repository, one or more coupons from the at least one coupon,
   wherein the repository stores information associated with the one or more coupons related to one or more web pages, including the first web page, that were visited by a user of the second device;
cause information associated with the one or more coupons to be provided to a third device to complete a transaction; and
receive, based on sensor information from an accelerometer component that is used to monitor movement while second information associated with the one or more coupons is provided for display, first information indicating whether the one or more coupons were used.

7. The first device of claim 6, wherein the one or more processors are further configured to:
monitor data from the second device to determine whether the second device provided the information associated with the one or more coupons to the third device; and
record, based on determining that the second device provided the information associated with the one or more coupons to the third device, information identifying that the one or more coupons have been used.

8. The first device of claim 6, wherein the information associated with the one or more coupons comprises:
identification information of an electronic message associated with the one or more coupons,
third party information associated with the one or more coupons,
information associated with an amount related to the one or more coupons, and
an expiration date associated with the one or more coupons.

9. The first device of claim 6, wherein the one or more processors are further configured to:
capture, an image of an electronic message associated with the user;
identify, based on processing the image, the one or more coupons; and
store the information associated with the one or more coupons in the repository.

10. The first device of claim 6, wherein the one or more processors are further configured to:
determine, based on accessing the electronic messaging account, a score associated with the one or more coupons,
   wherein the one or more coupons are further associated with an email related to the electronic messaging account; and
notify, based on a priority, the user to use a particular coupon of the one or more coupons,
   wherein the priority is determined based on the score associated with the particular coupon.

11. The first device of claim 6, wherein the second device is associated with a user device, and
wherein the first device is associated with a message configuration platform.

12. A non-transitory computer-readable medium storing a set of instructions, the set of instructions comprising:
one or more instructions that, when executed by one or more processors of a first device, cause the first device to:
   receive access information permitting access to an electronic messaging account hosted on a server device,
      wherein the access information permits access to the electronic messaging account by the first device for a particular amount of time;
   communicate, based on the access information, with the server device to access the electronic messaging account hosted on the server device,
      wherein the communication is limited to the particular amount of time;
   analyze historical messages associated with a folder related to the electronic messaging account;
   determine, based on analyzing the historical messages, a theme associated with the folder;
   process messages associated with the electronic messaging account to identify one or more messages, of the messages, that include at least one coupon,
      wherein one or more other messages associated with the folder are discarded from processing based on the theme, and
      wherein the processing comprises:
         capturing one or more first images of at least one of text in the messages or one or more second images included in the messages, and
         processing the one or more first images to determine the one or more messages that include that at least one coupon;
   store, at a repository, information associated with the one or more messages and the at least one coupon;
   receive information associated with online activity related to a second device;
   monitor, based on the information associated with the online activity, the online activity related to the second device,
      wherein the monitoring includes processing information associated with detection of navigation to a first web page of a retailer;
   identify, from the repository, one or more coupons from the at least one coupon,
      wherein the repository stores information associated with the one or more coupons related to one or more web pages, including the first web page, that were visited by a user of the second device;

cause information associated with the one or more coupons to be provided to a third device to complete a transaction; and receive, based on sensor information from an accelerometer component that is used to monitor movement while second information associated with the one or more coupons is provided for display, first information indicating whether the one or more coupons were used.

13. The non-transitory computer-readable medium of claim 12, wherein the one or more instructions further cause the first device to:

monitor data from the second device to determine whether the second device provided the information associated with the one or more coupons to the third device; and record, based on determining that the second device provided the information associated with the one or more coupons to the third device, information identifying that the one or more coupons have been used.

14. The non-transitory computer-readable medium of claim 12, wherein the information associated with the one or more coupons comprises:

identification information of an electronic message associated with the one or more coupons, third party information associated with the one or more coupons, information associated with an amount related to the one or more coupons, and an expiration date associated with the one or more coupons.

15. The non-transitory computer-readable medium of claim 12, wherein the one or more instructions further cause the first device to:

capture, an image of an electronic message associated with the user;

identify, based on processing the image, the one or more coupons; and store the information associated with the one or more coupons in the repository.

16. The non-transitory computer-readable medium of claim 12, wherein the one or more instructions further cause the first device to:

determine, based on accessing the electronic messaging account, a score associated with the one or more coupons, wherein the one or more coupons are further associated with an email related to the electronic messaging account; and notify, based on a priority, the user to use a particular coupon of the one or more coupons, wherein the priority is determined based on the score associated with the particular coupon.

17. The device of claim 6, wherein the one or more processors are further configured to:

monitor use of the one or more coupons, wherein monitoring the use of the one or more coupons comprises receiving information indicating whether the one or more coupons were used based on information from a sensor of the third device.

18. The first device of claim 6, wherein the one or more processors are further configured to:

transmit, based on a priority associated with the one or more coupons, a notification associated with using a particular coupon of the one or more coupons.

19. The non-transitory computer-readable medium of claim 12, wherein the one or more instructions further cause the first device to:

transmit, based on a priority associated with the one or more coupons, a notification associated with using a particular coupon of the one or more coupons.

20. The first device of claim 6, wherein the sensor information is used to determine whether a first movement of the accelerometer matches a second movement associated with an indication of using the one or more coupons, wherein the second movement is associated with at least scanning a code.

\* \* \* \* \*